UNITED STATES PATENT OFFICE.

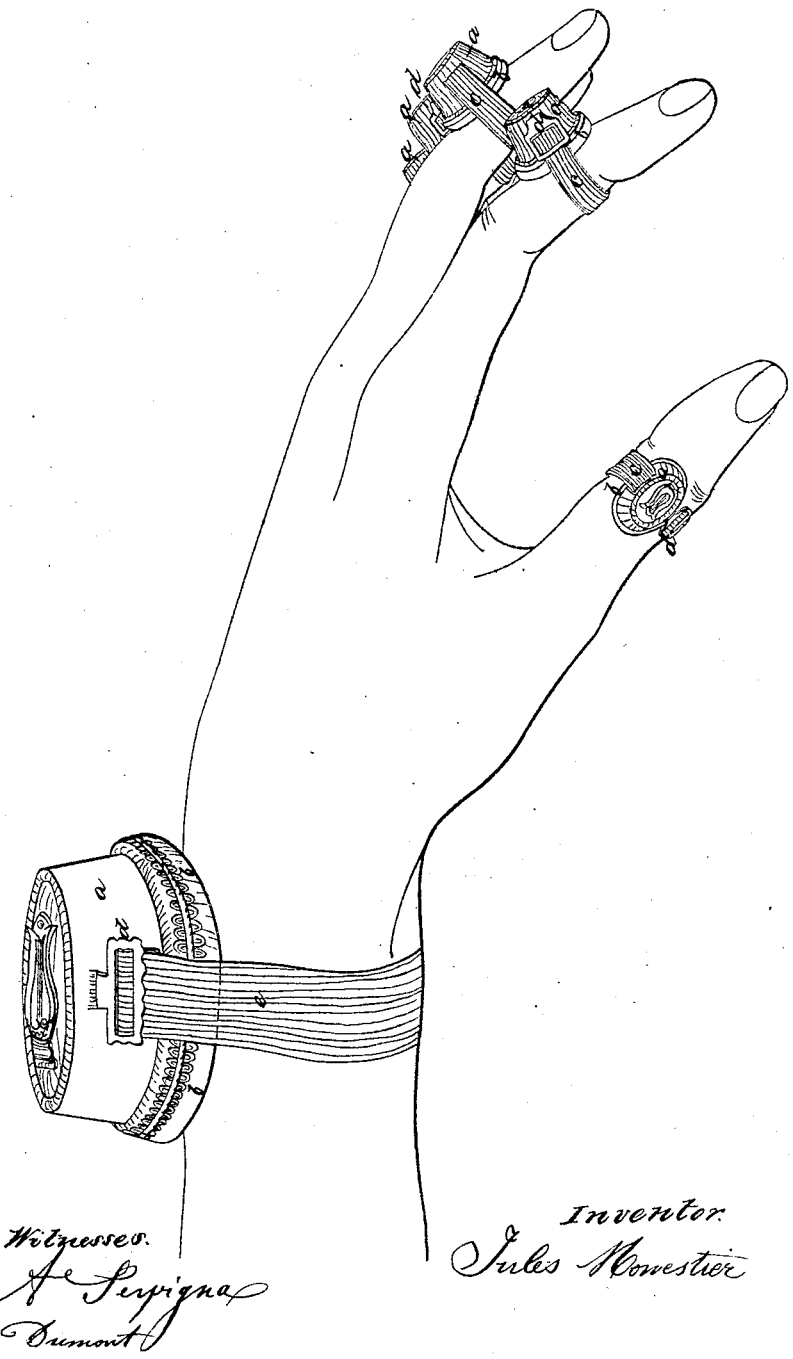

J. MONESTIER, OF ST. DENIS, NEAR PARIS, FRANCE, ASSIGNOR TO R. F. SPRANGENBERG, OF BROOKLYN, NEW YORK.

HAND-EXERCISER FOR MUSICIANS.

Specification of Letters Patent No. 19,814, dated March 30, 1858.

*To all whom it may concern:*

Be it known that I, JULES MONESTIER, of St. Denis, near Paris, in the Empire of France, have invented, made, and applied to use a certain new and useful Method of Exercising the Hands of Musicians, which I term "Agili Main;" and I do hereby declare that the following is a full, clear, and exact description of the nature and operation of the said invention, reference being had to the annexed drawing, making part of this specification, in which one hand of a musician is represented as fitted with my exercisers in a position similar to that assumed in performing on the pianoforte.

With students learning the piano forte and other musical instruments there is great difficulty in acquiring that graceful agility in the movements of the hands so essential for good performers:—with the piano, organ, melodion, violin bow, &c, there is a tendency for the fore arm of the performer to droop at the wrist, which is both inelegant and retards a free movement of the hand, and with the fingers there is not sufficient force and speed of movement for rapid execution and powerful touch on the instrument; to acquire this agility and suppleness, the student often occupies long months and years, and sometimes fails at last to acquire that dexterity of performance he seeks, and this is particularly the case with those commencing the study of music when past the period of childhood.

The nature of my said invention consists in applying weights to the wrists or fingers or both, in such a manner that while the free movements of the joints is not in the least obstructed, the fingers and wrist are strengthened by the exercise in moving said weights, the blow or force of the fingers on the instrument is increased, the hand is rendered supple and capable of greater freedom of movement, the fore arm is strengthened by the weight applied to the wrist and rendered more capable of holding the hand up for grace and freedom in performing; the hand attains greater freedom of motion at the wrist in consequence of the retarding and steadying action of the weight on the end of the fore arm.

My agili main can be worn by any person while performing or practising on the piano, organ, flute, flageolet, fife, violin or other musical instrument, and can also be worn by professors and others who have but little time to practice, while performing any ordinary duties or pursuing their ordinary avocations, as the weights tend constantly to exercise and strengthen the various parts and render them supple.

The weights applied to the various parts are to be regulated according to circumstances but when formed of about the size shown in the drawing they will suit the majority of persons, but smaller weights particularly at the wrist should be used for young children.

In the drawing I have represented my weights as constructed in what I believe to be the best manner, viz, an ornamental metallic shell, *a*, filled with lead, and having a cushion or pad *b*, between the weight and the person; *c*, is an elastic strap, one end of which is attached to the shell *a*, near its upper conical end, and the other end provided with a hooked buckle *d*, that can be slipped along on the said strap to lengthen or shorten the same, and when hooked into a cavity on the other side of the shell secures the weight in place.

When applied as a wristlet as shown in the drawing, the effect is to strengthen the fore arm and give freedom to the motion of the wrist: when applied as a bracelet or ring to the fingers the effect is the same on the fingers; and I would remark that said "agili main" should be applied near the outer end of the second joint of the fingers; and in case any one finger is found to be unusually weak or stiff, in its movements, two of said bracelets may be applied to the same.

I do not limit myself to any particular size or weight of my "agili main" nor to the manner of fastening the same in place although I believe that shown to be the best, but

What I claim as my invention and desire to secure by Letters Patent is—

The manner herein described of giving agility and suppleness to the fingers hand and wrist of musicians by the exercise induced by the application of my "agili main" substantially as and for the purposes specified.

In testimony whereof I have hereunto set my signature this second day of February 1858.

JULES MONESTIER.

Witnesses:
 A. PEYSGNA, Jr.,
 DUMONT.